REEL CLAMP FOR STRIP ENDS

Filed Sept. 15, 1964 2 Sheets-Sheet 1

INVENTOR:
WOODFIN V. LIGON, JR.

BY Clifton T. Hunt, Jr.

ATTORNEY

May 10, 1966 W. V. LIGON, JR 3,250,487

REEL CLAMP FOR STRIP ENDS

Filed Sept. 15, 1964 2 Sheets-Sheet 2

INVENTOR:
WOODFIN V. LIGON, JR.

BY Clifton T. Hunt, Jr.

ATTORNEY

United States Patent Office 3,250,487

Patented May 10, 1966

3,250,487

REEL CLAMP FOR STRIP ENDS

Woodfin V. Ligon, Jr., Farmville, Va., assignor to J. Barrye Wall, Jr., trustee, Farmville, Va.

Filed Sept. 15, 1964, Ser. No. 396,594

6 Claims. (Cl. 242—74.2)

This invention relates to a reel clamp for strip ends, and more particularly to a clamp for releasably fastening an end of a flexible strip such as ribbon, tape or film to the hub of a reel.

There have been many prior attempts to provide a satisfactory clamp of this character, but to my knowledge none of them have resulted in an economical and efficient clamp whose mechanism is disposed entirely within the confines of its associated reel so as not to interfere with manipulation or winding of the reel.

It is therefore the object of this invention to provide a clamp which will conveniently attach the end of a strip to the hub of a reel without damage to the strip and wherein the entire clamping mechanism, including its actuating assembly is disposed within the periphery of the associated reel.

Some of the objects of the invention having been stated, other objects will occur as the description proceeds when taken in connection with the accompanying drawings in which.

Figure 1:
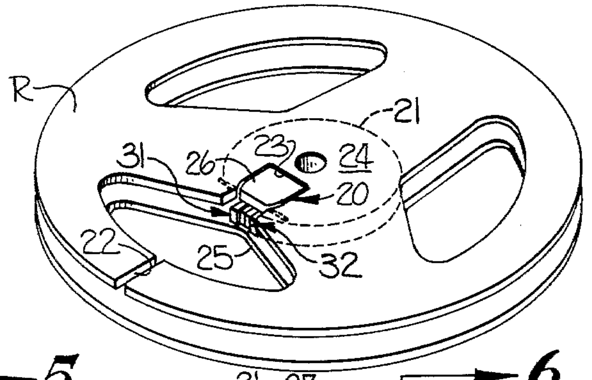
FIGURE 1 is a perspective view of the clamp incorporated in a reel of the type with which the present invention is adapted to be associated.

Referring more specifically to the drawings, the numeral 20 broadly designates a clamping assembly disposed within the hub 21 of a reel R which may be of the type conventionally used for magnetic tape or motion picture film, although the invention may be used to hold any flexible strip end adjacent the hub of the reel.

In order to provide a passage for the strip end to the jaws of the clamp, one marginal surface of the reel R is preferably split as at 22. The reel also has a cavity 23 in its hub portion communicating with one side 24 of the hub and with the circumference or radial periphery of the hub and about which the flexible strip is adapted to be wound. The cavity 23 extends axially of the hub toward its other side and in the form of invention shown in FIGURES 1 through 6 the inner wall of the cavity 23 is defined by the side 25 of the hub 21.

The clamp assembly 20 includes an actuating plate 26 within the cavity 23 which normally occupies the same plane as the side 24 of the reel and is spaced inwardly from the walls which define the cavity 23 to permit movement of the plate 26 relative to the hub. The plate 26 is connected adjacent its outer edge to the hub adjacent the walls of the cavity 23 by a pair of oppositely directed laterally extending pivot pins 27 each journalled in the hub 21. The pivoted actuating plate 26 supports a yoke 30 which extends into the cavity 23 from the medial portion of the plate 26 and is preferably of generally U-shaped configuration including a web **30*a* and legs 30*b* and 30*c*. The legs 30*b* and 30*c* extend axially of the hub and loosely penetrate the medial portions of a pair of clamp arms 31 and 32. The clamp arms 31 and 32 extend generally radially of the hub 21 and the lower surfaces of the clamp arms are supported by the web 30*a* of the yoke 30. The legs 30*b* and 30*c* thus serve as pivot pins about which the clamp arms 31 and 32 may move in a lateral direction relative to the plate 26. Since the clamp arms 31 and 32 are carried by the plate 26 they move with the plate 26 about the pivot point 27**.

The outer end portions of the clamp arms 31 and 32 terminate in cooperating jaw elements **31*a* and 32*a*, to the proximal surfaces of which suitable pads of foam rubber or the like 33** may be secured to assist in holding the end of the strip to be wound about the hub.

Figure 2:
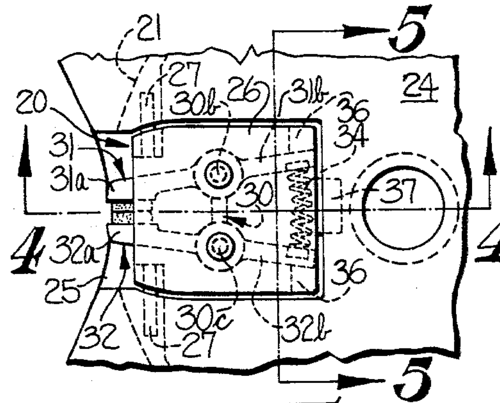
FIGURE 2 is an enlarged fragmentary plan view of a portion of the hub with portions of the clamp shown in dotted lines.
Figure 3:
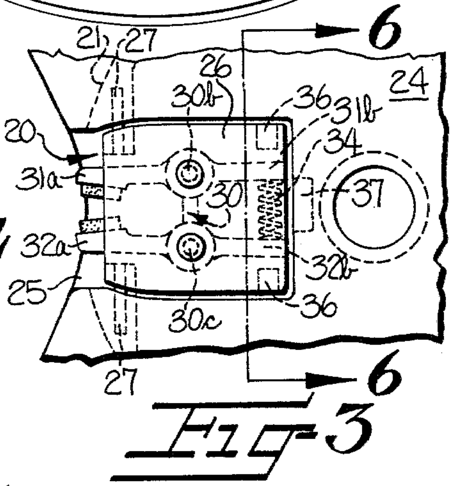
FIGURE 3 is a view similar to FIGURE 2 but showing the clamp with its jaws open.
Figure 4:
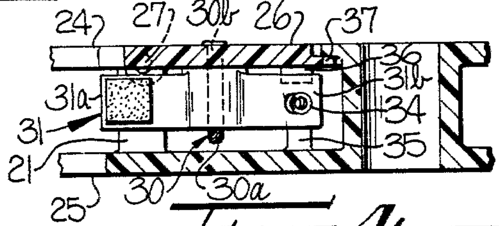
FIGURE 4 is a sectional view taken substantially along the line 4—4 in FIGURE 2.
Figure 6:
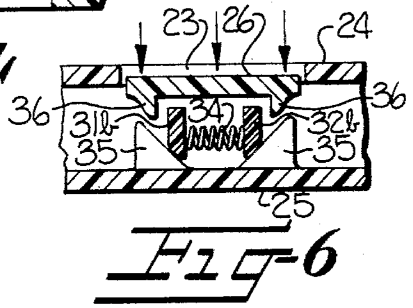
FIGURE 6 is a sectional view taken substantially along the line 6—6 in FIGURE 3.

The clamp arms 31 and 32 extend inwardly beyond the pivot points **30*b* and 30*c* to define actuating levers 31*b* and 32*b*, the inner ends of which are closely spaced from the inner wall of the cavity 23. A spring 34 normally urges the actuating levers 31*b* and 32*b*** away from each other as shown in FIGURE 2.

The levers **31*b*, 32*b* are engageable with a pair of laterally spaced fixed abutments 35 which extend into the cavity 23 toward the plate 26 from the inner surface of the side 25 of the hub 21. The proximal surfaces of the abutments 35 are inclined inwardly toward each other to provide cam surfaces for biasing the levers 31*b* and 32*b* toward each other in response to downward movement of the plate 26 and the clamp arms 31, 32 about the pivot point 27**.

Figure 5:
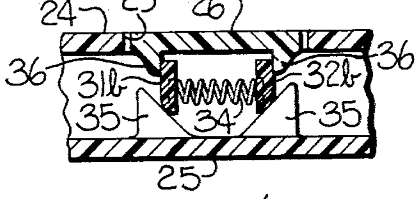
FIGURE 5 is a sectional view taken substantially along the line 5—5 in FIGURE 2.
Figure 7:
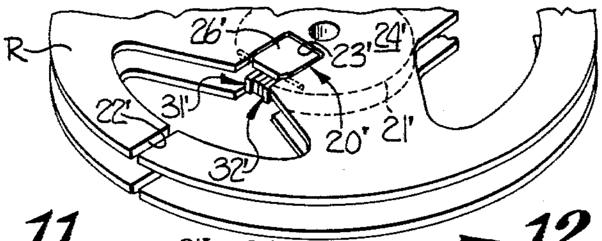
FIGURE 7 is a fragmentary perspective view similar to FIGURE 1 but showing a modified clamp which may be actuated from either side of the reel.
Figures 8, 9, 10, 11, 12:
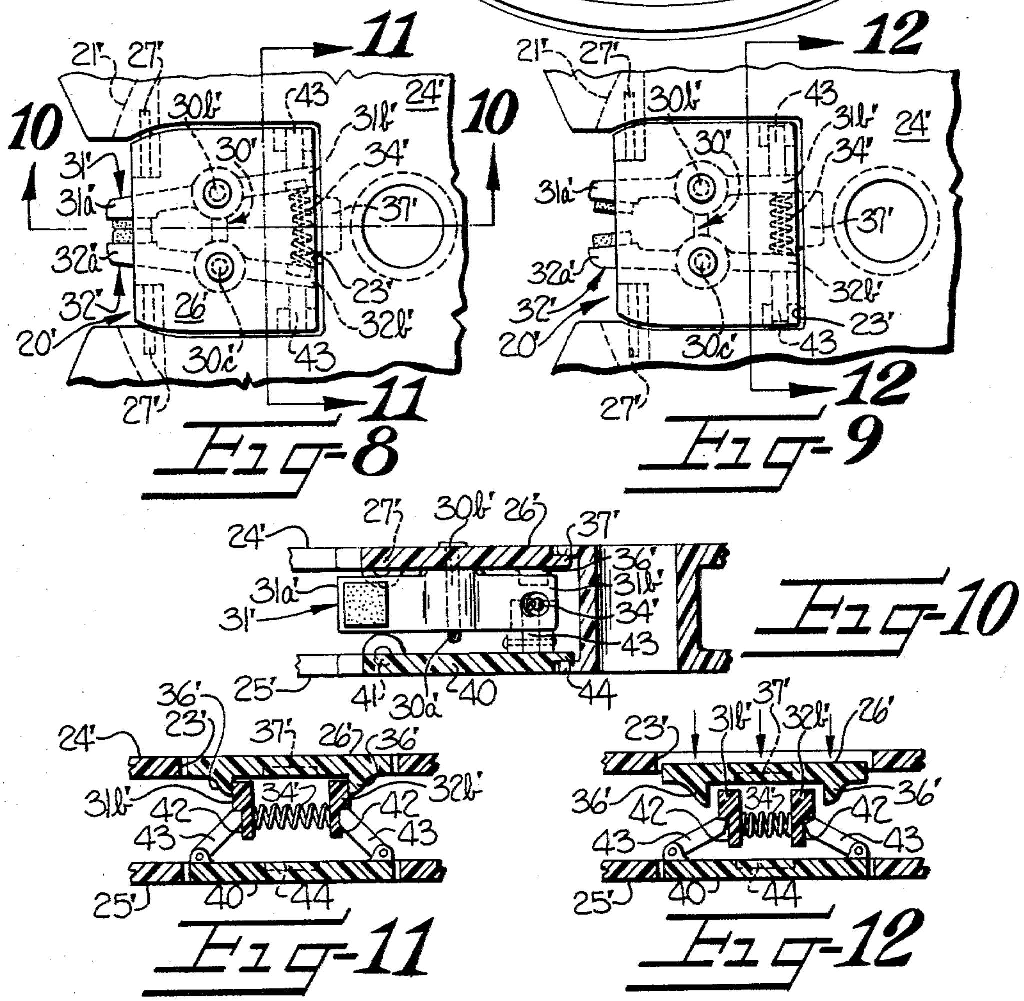
FIGURE 8 is an enlarged fragmentary plan view with part of the reel broken away and showing the clamp structure in dotted lines beneath the actuating plate on one side of the reel.
FIGURE 9 is a view similar to FIGURE 8 but showing the jaws in open position through manipulation of the actuating plate on the said one side of the reel.
FIGURE 10 is a sectional view taken substantially along the line 10—10 in FIGURE 8.
FIGURE 11 is a sectional view taken substantially along the line 11—11 in FIGURE 8.
FIGURE 12 is a sectional view taken substantially along the line 12—12 in FIGURE 9 and showing how the jaws are opened by manipulation of the actuating plate on said one side of the reel.
Figure 13:
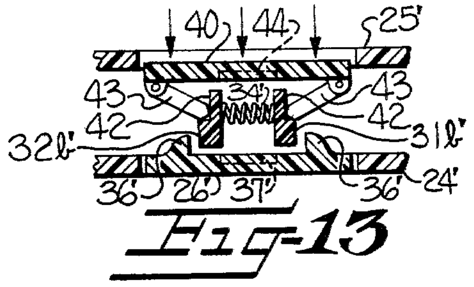
FIGURE 13 is a sectional view similar to FIGURE 12, but inverted, and showing how the jaws are opened through manipulation of the actuating plate on the other side of the reel.

When pressure is removed from the plate 26, such as would be the case after the strip end has been positioned between the jaws **31*a*, 32*a*, the spring 34 moves the levers 31*b* and 32*b* up the inclined proximal surfaces of the abutments 35 and away from each other to close the jaws 31*a*, 32*a* about the strip end while moving the plate 26 to the same plane occupied by the side 24 of the hub 21. A pair of stop members 36 depend from the plate 26 to limit outward movement of the levers 31*b*, 32*b* as shown in FIGURE 5 when the jaws 31*a* and 32*a* are closed as shown in FIGURE 2, and a radial lip 37 protrudes from the inner edge of plate 26 for engagement with the wall of cavity 23 to limit axial movement of plate 26 outwardly from the cavity 23**.

Assuming it is desired to wind a length of tape on the reel R, the free end of the tape, or strip end, not shown, may be passed through the slot 22 in the reel R preparatory to engaging the free end of the tape between the jaws **31*a*, 32*a* of the clamp assembly 20. The jaws 31*a*, 32*a* are moved apart to the position shown in FIGURE 3 by manually depressing the inner portion of the plate 26 to move the plate 26 and the clamp arms 31, 32 inwardly about the pivot point 27, thereby causing the levers 31***b*, 32*b* to move toward each other by traversing the inclined proximal faces of the abutments 35 and thereby opening the jaws 31*a*, 32*a*. When the strip end has been located between the jaws 31*a*, 32*a*, the pressure on the plate 26 may be removed and the spring 34 will cause the levers 31*b*, 32*b* to move away from each other as they traverse the inclined faces of the abutments 35 to close the jaws 31*a*, 32*a* and engage the strip end between the pads 33.

In another form of the invention, as illustrated in FIGURES 7 through 13, an actuating plate is provided adjacent each of the sides 24' and 25' of the hub 21', thereby making it possible to actuate the jaws from either side of the reel R. The actuating assembly adjacent the side 25' of the hub 21' is the same as the structure previously described except where otherwise indicated and like parts will bear like reference characters with the prime notation added.

As most clearly appears in FIGURES 10 through 13, the wall of the cavity 23' opposite the plate 26' is closed by a second actuating plate 40 which normally lies in the same plane as the side 25' of the hub 21'. The plate 40 is pivoted to the hub 21' adjacent the juncture of the cavity 23' with the circumferential periphery of the hub 21' by laterally extending opposite directed pivot pins 41 (FIGURE 10) in the same manner as the plate 26' is pivoted to the side 24' of the hub by the pivot pins 27'.

In this form of the invention, the distal surfaces of the levers 31*b'* and 32*b'* are cut away to define shoulders 42 which provide a seat for the free ends of a pair of pivoted arms 43 extending inwardly toward each other from their respective pivotal connections to opposite side portions of the plate 40. The plate 40 has a lip 44 extending inwardly in overlapping relation to the portion of the side 25' which defines the innermost wall of the cavity 23', the lip 44 serving to limit axial movement of the plate 40 outwardly from the cavity.

It being understood that the clamping assembly illustrated in FIGURES 7 through 13 is in all other respects the same as the assembly illustrated in FIGURES 1 through 6, and assuming, first, that it is desired to actuate the jaws 31*a'* and 32*a'* by manual depression of the plate 26', the inner portion of the plate 26' is depressed as before causing the shoulders 42 in the levers 31*b'* and 32*b'* to bear against the free ends of the pivoted legs 43 (FIGURE 12) thereby moving the free end portions of the legs 43 downwardly and toward each other to correspondingly move the levers 31*b'* and 32*b'* toward each other to pivot the jaws 31*a'* and 32*a'* apart. Release of the pressure on the plate 26' permits the spring 34' to move the levers 31*b'* and 32*b'* away from each other by pivoting the arms 43 upwardly and away from each other. Corresponding movement is thus imparted to the jaws 31*a'* and 32*a'* to close them about the tape and to the plate 26' to return it to its normal position.

Assuming now that it is desired to actuate the jaws through manual depression of the plate 40 (FIGURE 13), the plate 40 is depressed adjacent its inner end to move it about its pivot point 41, whereupon the pivoted legs 43 are caused to bear against the shoulders 42 on the levers 31*b'* and 32*b'* to overcome the spring 34' and permit the levers 31*b'* and 32*b'* to come together to open the jaws 31*a'* and 32*a'*. Removal of the downward pressure on the plate 40 permits the levers 31*b'* and 32*b'* to move apart causing corresponding inward movement of the jaws 31*a'* and 32*a'* as the clamp arms 31' and 32' move about their respective pivot points 30*b'* and 30*c'*.

There is thus provided a simple and efficient clamping device which may be manipulated from either side of a reel to effectively hold a strip end, and which clamping device is entirely confined within the periphery of the reel, so as not to present any obstacle to the winding operation.

In the drawings and specification there have been set forth preferred embodiments of the invention and, although specific terms are employed, they are used in a generic and descriptive sense only and not for purposes of limitation, the scope of the invention being defined in the claims.

I claim:

1. A strip end clamping device comprising:
(a) a reel having a hub,
(b) an actuating plate,
(c) said hub having a cavity therein communicating with one side of the reel and with the radial periphery of the hub,
(d) said actuating plate closing said cavity and normally lying in the same plane as said one side of the reel,
(e) means connecting the actuating plate to the hub for pivotal axial movement within the cavity,
(f) a pair of clamp arms including cooperating clamp jaws pivotally supported by the actuating plate within the cavity,
(g) spring means normally urging the clamp jaws toward each other, and
(h) biasing means within the cavity and operatively engageable with said clamp arms to move the clamp jaws away from each other in response to inwardly directed pressure on the actuating plate sufficient to overcome said spring means.

2. Means for clamping a strip end comprising:
(a) a reel having a hub and said reel also having a cavity therein communicating with one side of the reel and the radial periphery of the hub,
(b) an actuating plate disposed within the cavity and normally lying in the same plane as said one side of the reel,
(c) means connecting the actuating plate to the hub adjacent its radial periphery for pivotal axial movement relative to the reel,
(d) a pair of clamp arms pivotally supported by the actuating plate and disposed within the cavity and including,
  (i) cooperating clamp jaws disposed outwardly from the pivotal connection of the clamp arms with the actuating plate and adjacent the juncture of the cavity with the radial periphery of the hub and,
  (ii) actuating levers lying inwardly from the pivotal connection and disposed within said cavity,
(e) spring means normally urging the actuating levers away from each other; and
(f) biasing means operatively engageable with the outer surfaces of the actuating levers to move them toward each other in response to inward axial movement of the actuating plate within the cavity to pivotally open the clamp jaws.

3. A structure according to claim 1 wherein:
(a) one wall of the cavity is defined by the side of the reel opposite said one side of the reel and wherein,
(b) the biasing means comprises a pair of transversely spaced abutments extending into the cavity from said one wall of the cavity, and
  (i) the proximal faces of the abutments being inwardly inclined toward each other to define cam surfaces for moving the actuating levers together in response to inward movement of the actuating plate.

4. A structure according to claim 1 wherein:
(a) one wall of the cavity is closed by a second actuating plate normally lying in the same plane as the side of the reel hub opposite said one side of the reel and wherein,
(b) said biasing means comprises a pair of arms pivoted at their outer ends to the second actuating plate and extending transversely of the cavity toward each other, and (i) the inner ends of the arms operatively engaging the clamp arms.

5. A strip end clamping device comprising:
(a) a reel having a hub about which a strip of flexible material is adapted to be wound,
(b) said hub having a cavity therein communicating with both sides of the reel and with the annular periphery of the hub,
(c) first and second actuating plates adjacent opposite sides of the reel and disposed within said cavity,
(i) each actuating plate normally occupying the same plane as its respective side of the reel,
(ii) means limiting axial movement of each actuating plate outwardly from the cavity;
(d) a pair of clamp arms pivotally supported by said first actuating plate and disposed within said cavity,
(i) said clamp arms including cooperating jaw elements;
(e) spring means normally urging said cooperating jaw elements together,
(f) a pair of arms pivotally connected at corresponding ends to said second actuating plate and extending into said cavity toward each other from their respective pivotal connections with said second actuating plate,
(g) the inner ends of said pair of arms operatively engaging the clamp arms pivotally supported by said first actuating plate, and
(h) means pivotally connecting said first and second actuating plates to the reel for pivotal axial movement within said cavity whereby said pivoted arms on the second actuating plate will move toward each other in response to inward pressure on either of the actuating plates to impart corresponding movement to the clamp arms to open the cooperating jaw elements.

6. Means for clamping a strip end comprising:
(a) a reel having a hub, and also having a cavity therein communicating with one side of the reel and the radial periphery of the hub,
(b) an actuating plate disposed within the cavity,
(c) means pivotally connecting the actuating plate to the hub for pivotal movement within the cavity axially of the reel,
(d) means limiting movement of the actuating plate outwardly beyond the reel,
(e) a pair of clamp jaws operatively connected to the actuating plate and extending radially of the reel within said cavity, and
(f) means responsive to inward movement of the actuating plate to open the clamp jaws and means responsive to outward movement of the actuating plate to close the clamp jaws.

References Cited by the Examiner

UNITED STATES PATENTS

| | | | |
|---|---|---|---|
| 2,450,517 | 10/1948 | Koppel | 242—74.1 |
| 2,948,487 | 8/1960 | Locklin | 242—74.2 |

MERVIN STEIN, *Primary Examiner.*

N. L. MINTZ, *Assistant Examiner.*